(12) United States Patent
Maekawa et al.

(10) Patent No.: US 6,713,004 B2
(45) Date of Patent: Mar. 30, 2004

(54) PROCESS FOR PRODUCING A METHYL METHACRYLATE-BASED RESIN ARTICLE

(75) Inventors: Tomohiro Maekawa, Niihama (JP); Kenji Manabe, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 289 days.

(21) Appl. No.: 09/832,096

(22) Filed: Apr. 11, 2001

(65) Prior Publication Data
US 2001/0045682 A1 Nov. 29, 2001

(30) Foreign Application Priority Data
Apr. 27, 2000 (JP) .................................. 2000-127224

(51) Int. Cl.[7] .............................................. B29C 47/76
(52) U.S. Cl. ..................... 264/102; 264/141; 264/176.1
(58) Field of Search ..................... 264/141, 211.21, 264/349, 101, 102, 176.1, 211

(56) References Cited

U.S. PATENT DOCUMENTS

| | | | | |
|---|---|---|---|---|
| 3,852,387 A | * | 12/1974 | Bortnick et al. | 264/40.5 |
| 5,026,512 A | * | 6/1991 | Chang | 264/40.6 |
| 5,372,765 A | * | 12/1994 | Chen et al. | 264/101 |
| 5,385,462 A | * | 1/1995 | Kodama et al. | 425/135 |
| 5,530,080 A | * | 6/1996 | Siol et al. | 526/224 |
| 5,597,891 A | * | 1/1997 | Nelson et al. | 528/481 |
| 5,599,888 A | * | 2/1997 | Higuchi et al. | 526/212 |
| 6,454,976 B1 | * | 9/2002 | Neubauer | 264/85 |

OTHER PUBLICATIONS

Concise Encyc. of Polymer Sci. and Engineering, Kroschwitz, J. I., Ed., John Wiley & Sons, 1990, p. 18–19.*
JAPIO Abstract corresponding to Japanese Publication No. 11–021357–A.
JAPIO Abstract corresponding to Japanese Publication No. 11–019928–A.

* cited by examiner

*Primary Examiner*—Mark Eashoo
(74) *Attorney, Agent, or Firm*—Sughrue Mion, PLLC

(57) ABSTRACT

A process for producing an article of resin made from at least about 50% by weight of methyl methacrylate is provided, which comprises a step of melt-processing the resin with an extruder, wherein an oxygen concentration of a gaseous phase in a resin feed zone of the extruder falls within a range of from about 0.7% by volume to about 10% by volume. The article is excellent in curbing the coloring in melt processing.

7 Claims, 2 Drawing Sheets

PROCESS FOR PRODUCING A METHYL METHACRYLATE-BASED RESIN ARTICLE

FIELD OF THE INVENTION

The present invention relates to a process for producing a methyl methacrylate-based resin article. In particular, the present invention relates to a process for producing an article, which comprises a step of melt processing a methyl methacrylate-based resin with an extruder.

BACKGROUND OF THE INVENTION

Since methyl methacrylate-based resin is excellent in transparency, it is used as a raw material for optical articles. In processing the methyl methacrylate-based resin into optical articles, beads or pellets of the resin are usually heat melted and molded to the article. This melt processing sometimes causes coloring of the resin, and various researches have been conducted to curb such a coloring.

There are many methods known as the methods for curbing the coloring in the melt processing of methyl methacrylate-based resin, in which a kind or concentration of gas used therein are controlled. For example, Japanese Patent Application Laid-Open (JP-A) No. 63-2004 discloses a method of spinning an acrylate-based polymer under substantially oxygen-free conditions to produce an optical fiber, and JP-A No. 11-19928 and JP-A No. 11-21357 respectively disclose a method of dispersing a specific silicone resin in powders or pellets of methacrylate resin and melting and mixing them while continuously sending dried nitrogen into a hopper of extruder. However, these conventional methods are still insufficient in curbing the coloring of the resin.

SUMMARY OF THE INVENTION

One of the objects of the present invention is to provide a process for producing a methyl methacrylate-based resin article which is excellent in curbing the coloring of the resin, to solve the problem described above.

The present inventors have studied on a process for producing a methyl methacrylate-based resin article. As a result, the present inventors have found that the above object can be achieved by conducting the melt-extrusion processing of methyl methacrylate-based resin in a specific gas atmosphere, and have completed the present invention.

That is, the present invention provides a process for producing an article of resin made from at least about 50% by weight of methyl methacrylate, which comprises a step of melt-processing the resin with an extruder, wherein an oxygen concentration of a gaseous phase in a resin feed zone of the extruder falls within a range of from about 0.7% by volume to about 10% by volume.

DETAILED DESCRIPTION OF THE INVENTION

Figure 1:
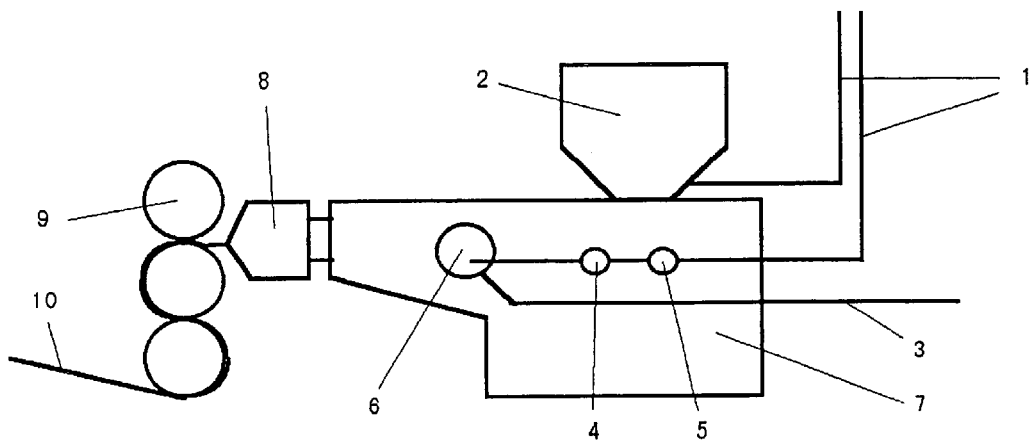
FIG. 1 is a schematic side view of one example of the extruder usable in the present invention.

In the present invention, a methyl methacrylate-based resin article is produced in a process comprising a step of melt-processing a methyl methacrylate-based resin with an extruder, wherein an oxygen concentration of a gaseous phase in a resin feed zone of the extruder falls within a range of from about 0.7% by volume to about 10% by volume.

The methyl methacrylate-based resin is a polymer which contains at least about 50% by weight of methyl methacrylate as a monomer constituting the resin. The resin may be a homopolymer substantially of methyl methacrylate or a copolymer of at least about 50% by weight of methyl methacrylate and less than about 50% by weight of an unsaturated monomer copolymerizable therewith.

Examples of the unsaturated monomer include methacrylates such as ethyl methacrylate, butylmethacrylate, cyclohexyl methacrylate, phenyl methacrylate, benzyl methacrylate, 2-ethylhexyl methacrylate and 2-hydroxyethyl methacrylate; acrylates such as methyl acrylate, ethyl acrylate, butyl acrylate, cyclohexyl acrylate, phenyl acrylate, benzyl acrylate, 2-ethylhexyl acrylate and 2-hydroxyethyl acrylate; unsaturated acids such as methacrylic acid and acrylic acid; styrene, a-methyl styrene, acrylonitrile, methacrylonitrile, maleic anhydride, phenyl maleimide, cyclohexyl maleimide and the like. Two or more of these monomers may be used, if necessary. The copolymer described above may have a glutaric anhydride or glutarimide unit.

The methyl methacrylate-based resin may previously have been compounded with an additive. Example of the additive include rubber-like polymers such as a diene rubber and an acrylic rubber, UV absorbers, antioxidants, lubricants, light-diffusing agents, matting agents, antistatic agents, dyes, pigments, flame-retardants, mold release agents and the like. Such an additive may be compounded with the resin during the production process of the present invention. In the present invention, the coloring of these additives due to heating may also be curbed and, therefore, additives which are conventionally difficult to be employed (because of easy coloring) may be utilized.

The process of the present invention may be conducted using a conventionally known extruder having a resin feed zone such as a hopper. A screw of the extruder may be single or twin. The extruder is preferably the one having a vent, and may be provided with one or more vents.

In the present invention, an oxygen concentration of the gaseous phase in a resin feed zone of the extruder may be about 0.7% by volume or more, preferably about 1% by volume or more, and about 10% by volume or less, preferably about 5% by volume or less. By regulating the oxygen concentration in such a specific range, the resin can be prevented from being colored.

The gaseous components other than oxygen may be contained in the gaseous phase in the resin feed zone as long as those are inert to the resin, additives, devices used therewith and the like. Examples of such components include inert gases such as nitrogen, carbon dioxide, argon, xenon and helium. Two or more kinds of these gases may be used, if necessary. In particular, nitrogen, carbon dioxide and argon are preferred in the point of, for example, costs. Insofar as the effect of the present invention is not hindered, the inert gas may contain steam or the like.

For regulating the oxygen concentration, a mixed gas of oxygen (or air) and an inert gas, which has the predetermined concentration of oxygen, may be sent to the resin feed zone, or alternatively, oxygen (or air) and an inert gas may be sent separately to the resin feed zone. The gas may be sent intermittently or continuously.

The gas may be sent to the resin feed zone through a gas feed line. When using the pipe, the outlet of the gas feed line is preferably placed as near as possible to a contact part of the resin with the extruder screw.

The gas thus sent to the resin feed zone may be exhausted through, for example, an air outlet provided at an upper part of the resin feed zone, and/or a vent if the extruder has it.

When the extruder having a vent is utilized, it is preferred that an oxygen concentration of a gaseous phase in the vent falls within the range of 0% by volume to about 10% by volume. Such an atmosphere in the vent is provided by, for example, sending an inert gas having such an oxygen concentration into the vent. The inert gas may include those described above, for example, nitrogen, carbon dioxide, argon, xenon, helium etc., and two or more kinds of such gases may be used. In particular, nitrogen, carbon dioxide and argon are preferred in the point of, for example, costs. By using such an inert gas in the vent, the coloring of impurities in the resin adhering to the vent may be curbed, so that the adverse effect of the impurities may be reduced even when the impurities are contained in a resulting resin article.

The gas sent to the vent and the gas sent to the resin feed zone may be the same or different from each other. It is preferred to use the same gas both in the vent and in the resin feed zone since the same gas-feeding source can be used, which results in easy operation.

A pressure in the vent may falls within the range of from about 0.1 to about 100 KPa, preferably within the range of from about 0.1 to about 50 KPa. When the pressure is in this range, the resulting resin article may be further prevented from being colored, to improve its outward appearance.

The gas may be sent to the vent through a gas feed line provided at, for example, a lid of the vent or another part of the vent. The gas feed line is preferably provided at a place as near as possible to a screw of the extruder.

When the gas is sent through the gas feed line provided at the resin feed zone or the vent of the extruder, the gas feed line preferably has a filter so as to reduce contamination of the gas with foreign materials. For sending the inert gas to the vent, a reducing valve is preferably provided in the gas feed line so that a flow rate can be easily controlled.

An example of the extruder (usable in the present invention) for producing sheets is described as follows, by reference to the drawings.

FIG. 1 is a schematic side view of the extruder. The starting materials such as resin beads or pellets (and additives if necessary) are fed via a hopper 2 (a resin feed zone) to an extruder 7 and formed into a resin sheet 10 via a T die 8 and polishing rolls 9. An inert gas having a predetermined oxygen concentration is sent to the hopper 2 and a vent 6 respectively via two gas feed lines 1, 1. A flow meter 5 and a reducing valve 4 are arranged in the gas feed line 1 for the vent 6, to facilitate regulation of the flow rate of the gas therein. The vent 6 is under reduced pressure by evacuation with e.g. a vacuum pump via a pressure reducing line 3.

Figure 2:
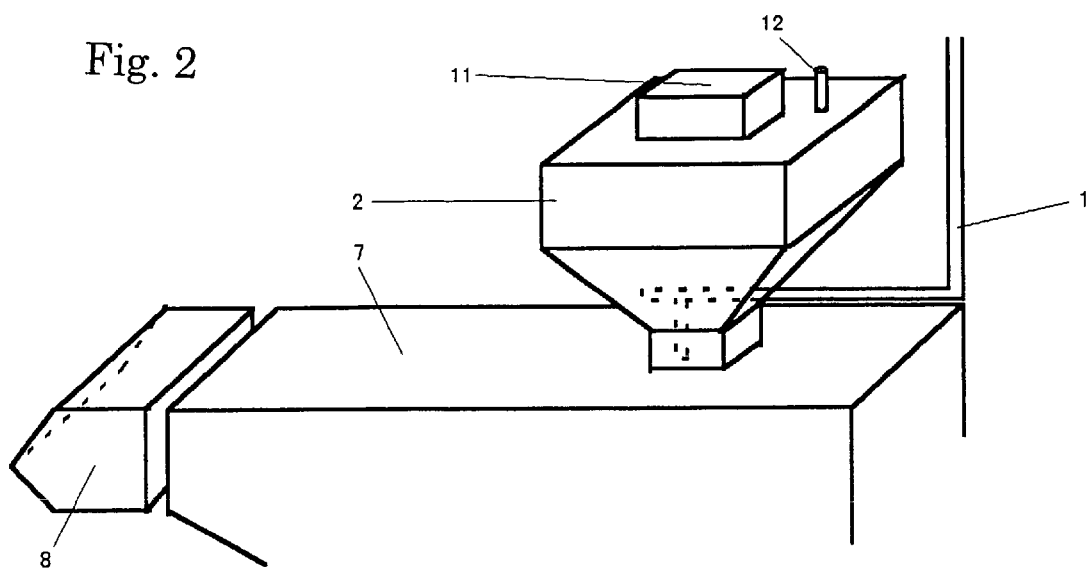
FIG. 2 is a schematic perspective oblique view of the resin feed zone (hopper) in the extruder shown in FIG. 1.

FIG. 2 is a schematic perspective oblique view of the resin feed zone (hopper 2) in the above-described extruder. The hopper 2 is closed with a material-introducing lid 11 except when the starting materials are introduced therein, and a majority of the inert gas sent via the gas feed line 1 to the hopper 2 is exhausted through an air outlet 12 provided at an upper part of the hopper 2.

Figure 3:
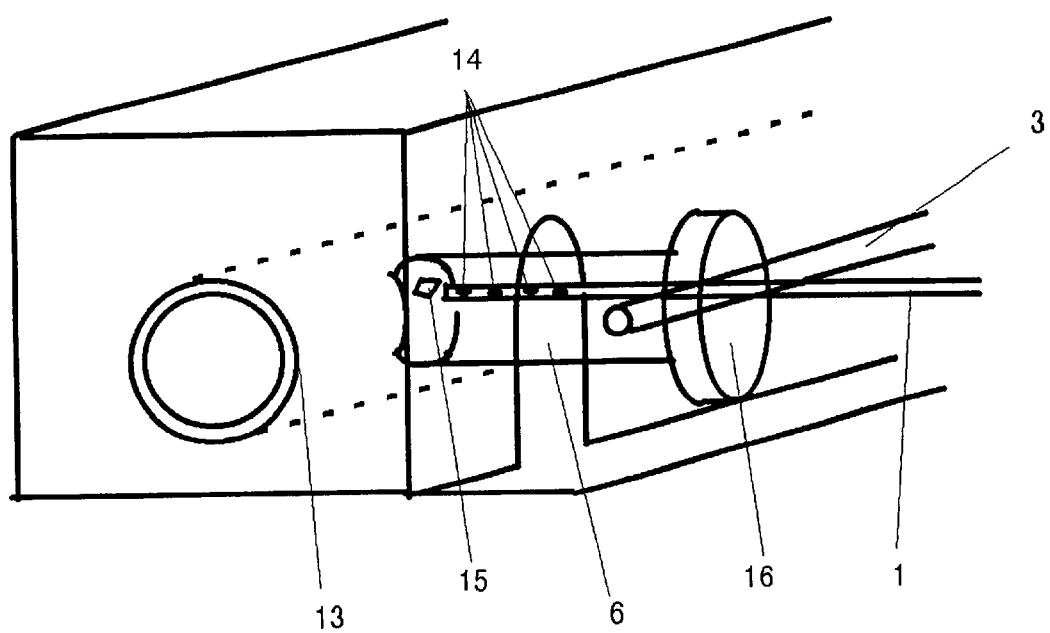
FIG. 3 is a schematic perspective oblique view of the vent in the extruder shown in FIG. 1.

FIG. 3 is a schematic perspective oblique view of the vent 6 in the above-described extruder. The vent 6 is connected with a cylinder 13 via a vent vacuum hole 15, and volatile components and gas present in the molten resin in the cylinder are sucked through the vent vacuum hole 15 into the vent 6 and removed through the pressure reducing line 3. The gas feed line 1 penetrates through a vent lid 16 into the vent 6, and the inert gas is sent to the vent 6 through gas feeding holes 14 provided in the gas feed line 1.

Examples of melt processing with an extruder in the present invention include granulation in which beads etc. are fed to an extruder to produce pellets via a strand die and a strand cutter; extrusion molding in which beads, pellets etc. are fed to an extruder to produce sheets or films via a T die and a roll unit; profile extrusion molding in which beads, pellets etc. are fed to an extruder to produce complex molded articles via a sizing die; injection molding in which beads, pellets etc. are fed to an extruder and subjected to cooling solidification in a mold to produce various molded articles; or the like. In particular, when the present invention is applied for pelletization or extrusion molding to produce an article such as pellet, film or sheet, an article excellent in less being colored which has uniform qualities may always be obtained.

The films and sheets thus produced may be used for many kinds of articles such as a light guide sheet, a lens film, a lens sheet and a light diffusion sheet.

As described above, the present invention provide a process for producing a methyl methacrylate-based resin article with less being colored in melt processing, in a form of pellet, film, sheet or the like, which is useful as optical materials, optical parts or the like.

The method for producing the methyl methacrylate-based resin article of the present invention is described in Japanese application No. 2000-127224, filed on Apr. 27, 2000, the complete disclosures of which are incorporated herein by reference.

EXAMPLES

The present invention is described in more detail by following Examples, which should not be construed as a limitation upon the scope of the present invention.

The constitution of the extruder used in Examples and Comparative Examples is as follows.
Extruder: A extruder having a single screw (screw diameter; 40 mm) with a vent (produced by Tanabe Plastics Co., Ltd.)
Die: A T die with a lip width of 250 mm and a lip gap of 6 mm.
Roll: Three polishing rolls, which are vertical type.

The extruder, the resin feed zone (hopper) and the vent are the same as illustrated in FIGS. 1, 2 and 3, respectively.

The physical properties of the obtained sheet were measured as follows:

Average Light Transmittance

The sheet to be measured was cut into a 25 cm×5 cm piece, and 4 side faces of the piece were mirror-polished. The light transmittance in a 25-cm light-passing length of the piece was measured by U4000 model spectrophotometer (produced by Hitachi, Ltd.) at 5 nm intervals in the range of from 380 to 780 nm, and its average light transmittance was calculated.

Yellow Index (YI)

The tristimulus values (X, Y, Z) were determined based on the light transmittance measured at 5 nm intervals for calculation of the average light transmittance. Using the tristimulus values, Yellow Index (YI) of the sheet was calculated from the equation YI=(100×(1.28X−1.06Z))/Y. The lower YI means the lower coloring of the sheet. Oxygen concentration:

An oxygen concentration was measured by ODT-100 model oxygen concentration meter (produced by Shibata Kagakukiki Kogyo Co., Ltd.).

Examples 1 to 3 and Comparative Examples 1 to 3

Pellets of methyl methacrylate-based resin with a molecular weight of 140,000 (methyl methacrylate/methyl acrylate=94/6 (ratio by weight), containing 160 ppm of UV absorber) were introduced into the hopper of the extruder, and the resin was melt-extruded at a temperature of 285° C. while sending a mixed gas of nitrogen and air to the hopper and vent and keeping a pressure in the vent of 8 KPa, to obtain a sheet of 3mm in thickness and 21 cm in width. Such a procedure was conducted respectively for each Examples 1–3 and Comparative Examples 1–3 with changing the oxygen concentration of the mixed gas (sent to the hopper and the vent) as shown in Table 1. The physical properties of the obtained sheet are shown in Table 1.

TABLE 1

| | Oxygen concentration (% by volume) | | Pressure | Physical properties of the sheet | |
|---|---|---|---|---|---|
| | In the hopper | In the vent | (KPa) In the vent | Average light transmittance (%) | YI |
| Comparative Example 1 | 0.3 | 0.3 | 8 | 79.2 | 3.1 |
| Comparative Example 2 | 0.5 | 0.5 | 8 | 79.0 | 3.0 |
| Example 1 | 1.0 | 1.0 | 8 | 80.6 | 1.6 |
| Example 2 | 2.0 | 2.0 | 8 | 80.1 | 1.9 |
| Example 3 | 5.0 | 5.0 | 8 | 79.5 | 1.7 |
| Comparative Example 3 | 20.4 | 20.4 | 8 | 78.5 | 2.4 |

Example 4 and Comparative Examples 4 to 5

Pellets of methyl methacrylate-based resin with a molecular weight of 110,000 (methyl methacrylate/methyl acrylate=96/4 (ratio by weight), containing 110 ppm of UV absorber) were introduced into the hopper in the extruder, and the resin was melt-extruded at a temperature of 270° C. while sending a mixed gas of nitrogen and air was sent to the hopper and vent*, to obtain a sheet of 3.5 mm in thickness and 20 cm in width. Such a procedure was conducted respectively for each Examples 4 and Comparative Examples 4–5 with changing the oxygen concentration of the mixed gas (sent to the hopper and the vent*) and the pressure in the vent as shown in Table 2. The physical properties of the obtained sheet are shown in Table 2. * Only in Comparative Example 5, no gas was sent to the vent.

TABLE 2

| | Oxygen concentration (% by volume) | | Pressure | Physical properties of the sheet | |
|---|---|---|---|---|---|
| | In the hopper | In the vent | (KPa) In the vent | Average light transmittance (%) | YI |
| Comparative Example 4 | 0.1 | 0.1 | 5 | 78.9 | 5.3 |
| Example 4 | 2.9 | 2.9 | 5 | 79.6 | 4.8 |
| Comparative Example 5 | 20.0 | — | 1 | 77.1 | 5.4 |

What is claimed is:

1. A process for producing an article of resin made from at least about 50% by weight of methyl methacrylate, which comprises a step of melt-processing the resin with an extruder, wherein an oxygen concentration of a gaseous phase in a resin feed zone of the extruder falls within a range of from about 0.7% by volume to about 10% by volume.

2. A process for producing an article of resin according to claim 1, wherein the extruder has a vent and an oxygen concentration of a gaseous phase in the vent falls within the range of 0% by volume to about 10% by volume.

3. A process for producing an article of resin according to claim 2, wherein the oxygen concentration of the gaseous phase in the vent is controlled by sending an inert gas having an oxygen concentration of from 0% by volume to about 10% by volume to the vent.

4. A process for producing an article of resin according to claim 1, wherein the article is in the form of pellet, film or sheet.

5. A process for producing an article of resin according to claim 1, wherein the oxygen concentration falls within a range of from about 0.7% by volume to about 5% by volume.

6. A process for producing an article of resin according to claim 5, wherein the oxygen concentration falls within a range of from about 1% by volume to about 5% by volume.

7. A process for producing an article of resin according to claim 1, wherein the resin comprises an additive.

* * * * *